United States Patent [19]

Nakagawa et al.

[11] 4,079,716

[45] Mar. 21, 1978

[54] MANIFOLD SYSTEM

[75] Inventors: Yasuhiko Nakagawa, Fujisawa; Yoshitaka Ohki, Yokohama, both of Japan

[73] Assignee: Nissan Motor Company, Ltd., Japan

[21] Appl. No.: 592,797

[22] Filed: Jul. 2, 1975

[30] Foreign Application Priority Data

Jul. 3, 1974 Japan .................................. 49-75443

[51] Int. Cl.² ........................................... F02M 31/00
[52] U.S. Cl. ...................... 123/122 AB; 123/122 AC; 123/32 ST; 123/32 SP
[58] Field of Search ..... 123/122 AB, 122 R, 122 AC, 123/122 H, 32 ST, 32 SP; 261/145; 165/52

[56] References Cited

U.S. PATENT DOCUMENTS

| 3,890,942 | 6/1975 | Date | 123/122 AB |
| 3,916,850 | 11/1975 | Date | 123/32 ST |
| 3,941,106 | 3/1976 | Kobayashi | 123/122 AC |
| 3,970,062 | 7/1976 | Nakada | 123/122 AC |

Primary Examiner—Ronald H. Lazarus

[57] ABSTRACT

A fraction of exhaust gas heatingly contacts an induction manifold riser bottom wall and an adjacent radiating wall to heat said riser bottom wall rapidly to vaporize fuel droplets passing through multiple air fuel induction passages.

1 Claim, 12 Drawing Figures

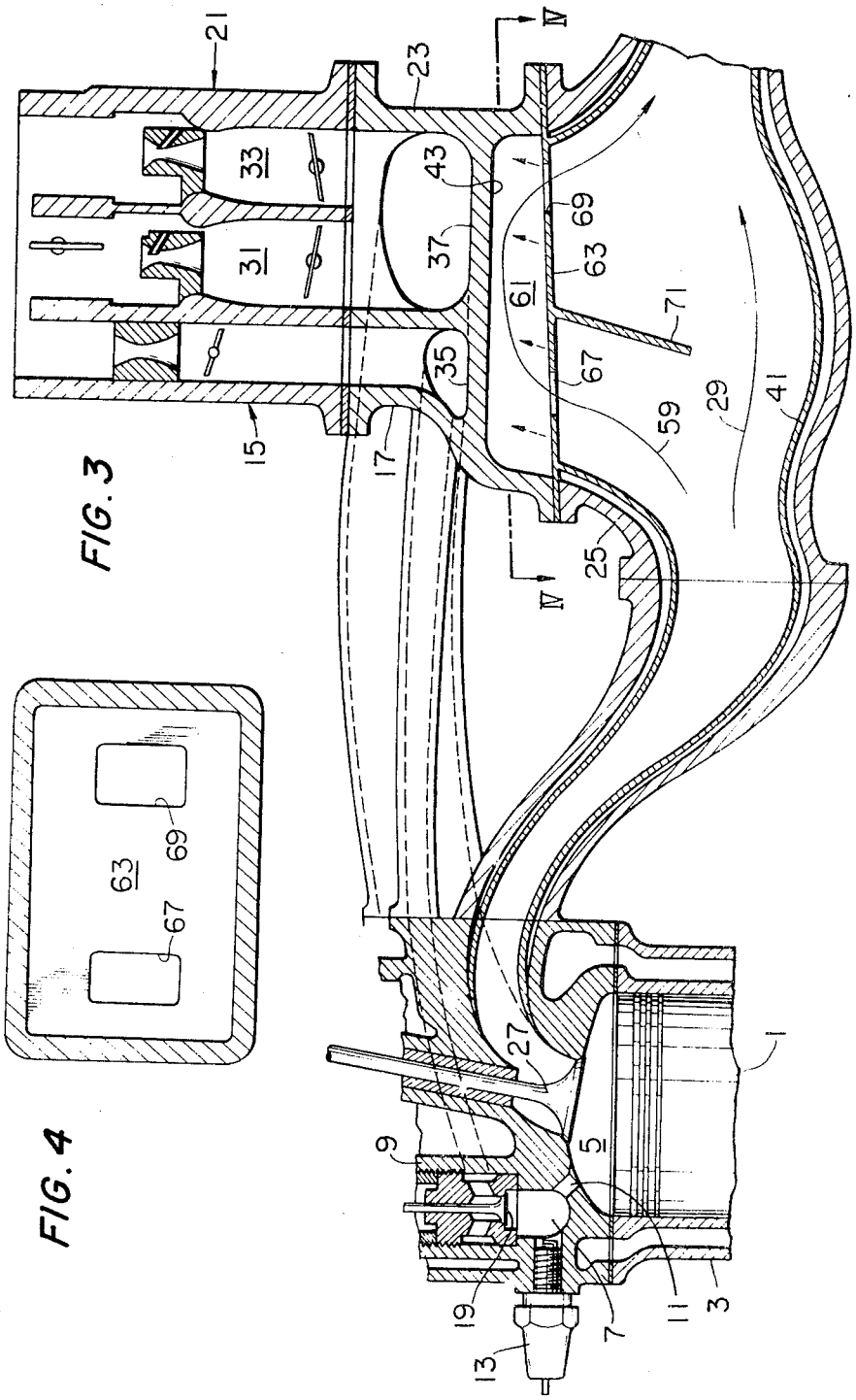

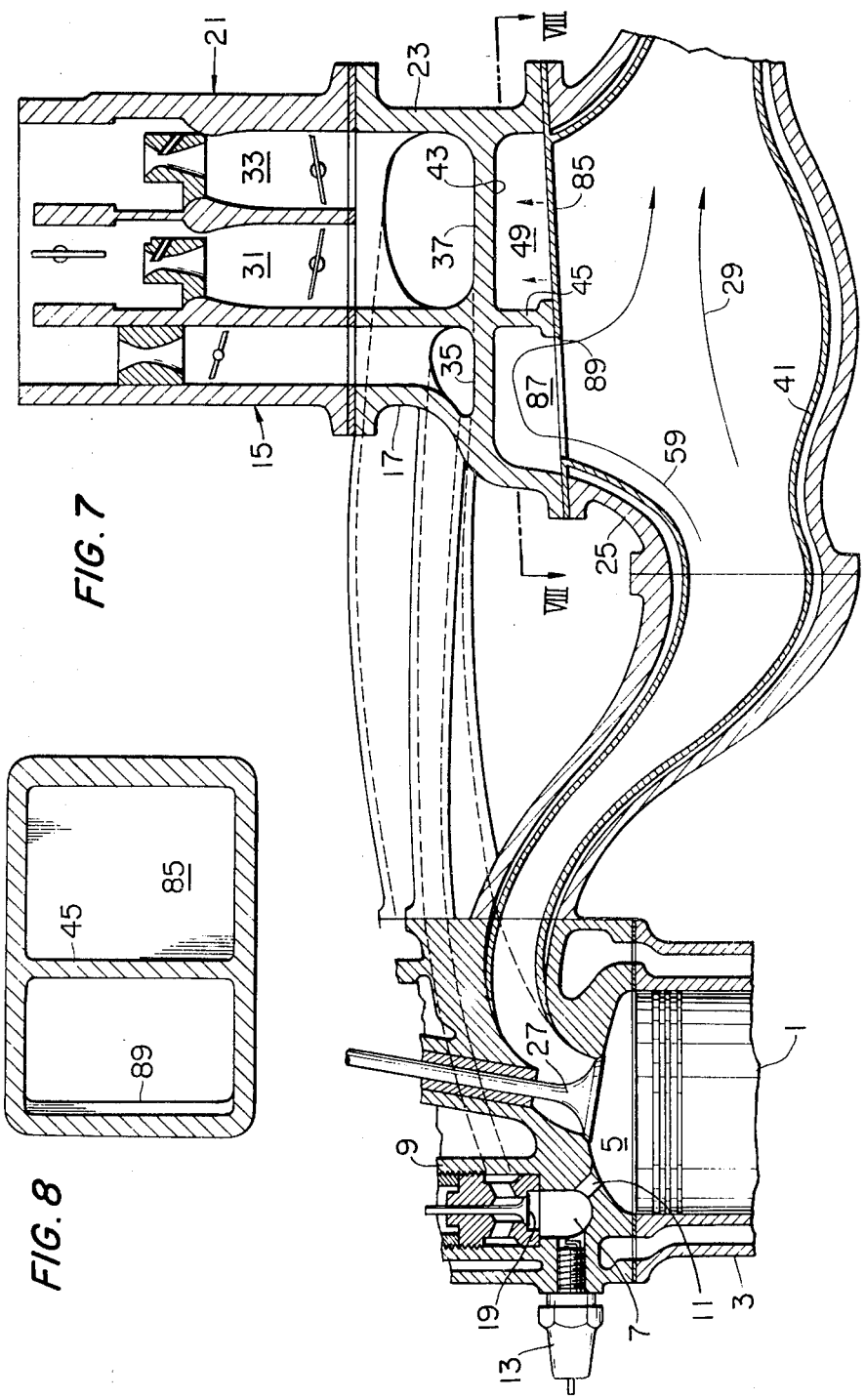

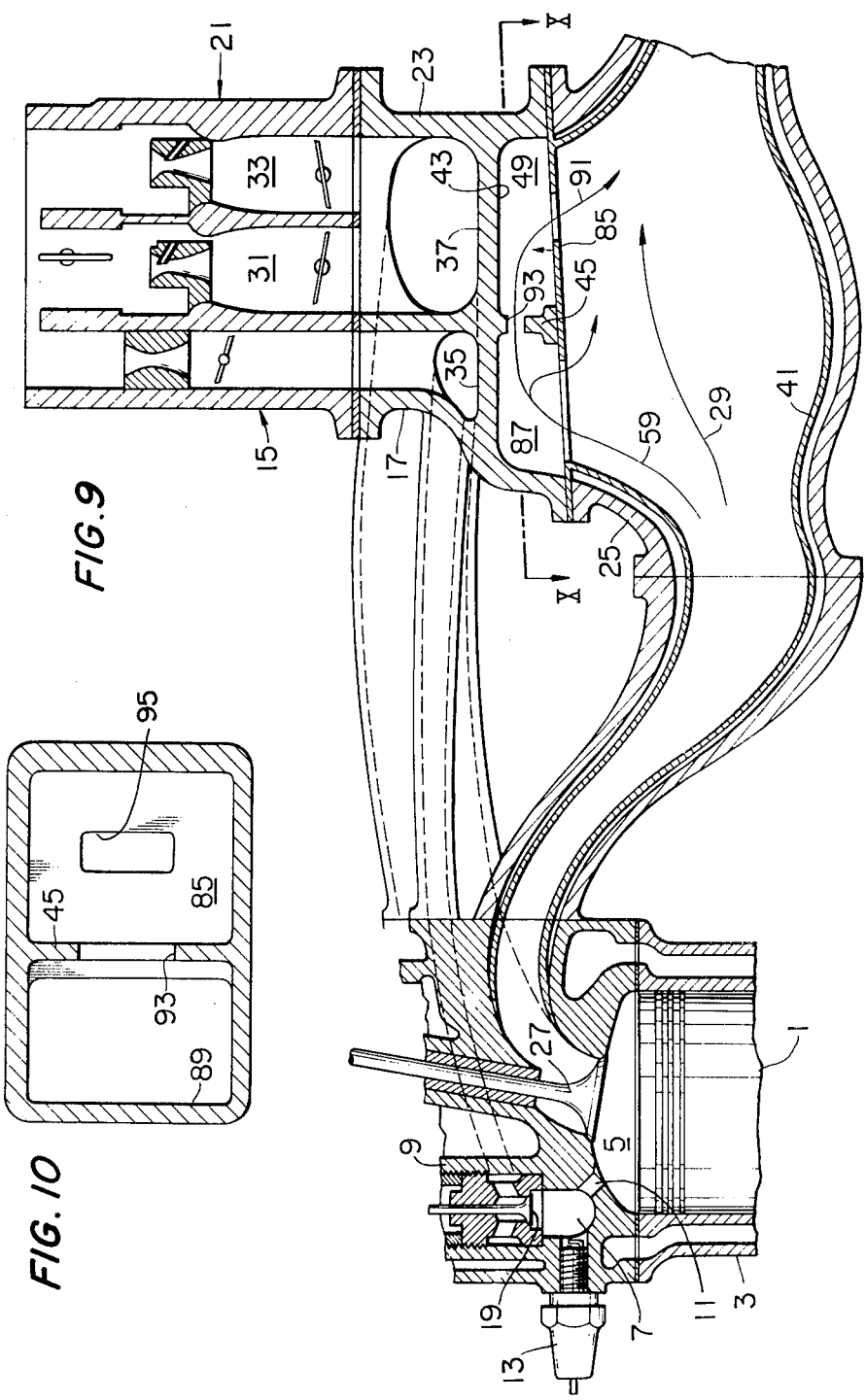

MANIFOLD SYSTEM

The present invention relates to a manifold system for an internal combustion engine and also to a manifold system for an internal combustion engine of the type having an auxiliary combustion chamber associated with each main combustion chamber and connected by a torch nozzle. More particularly the invention relates to a manifold system in which convection heat of exhaust gas and radiation heat thereof are employed as the intake heat source for preconditioning the incoming air-fuel mixture to the associated engine.

The intake manifold of an internal combustion engine must be exposed to heat to facilitate vaporisation of fuel droplets therein so that fuel may be evenly distributed to each cylinder.

One of the conventional manifold systems known to those skilled in the art has an arrangement in which an intake manifold and an exhaust manifold have a common wall forming the riser bottom wall of the intake manifold and means is disposed in the exhaust manifold to make exhaust gas flow against the bottom wall. One problem of this conventional manifold system is in that exhaust gas temperature drops appreciably because most heat is transferred from the exhaust gas to the common wall. The drop of the exhaust gas temperature would cause, in an extreme case, exhaust gas to be incompletely oxidized in an exhaust gas purifier provided in an exhaust pipe unless an appropriate apparatus to heat the exhaust gas is provided in or in the vicinity of the purifier. The provision of this heating apparatus leads to complicated construction and arrangement of the exhaust gas purifier in the exhaust system.

Another conventional manifold system has an engine coolant jacket below a riser bottom wall of an intake manifold, through which the engine coolant circulates to heat the riser bottom wall. Although the use of engine coolant as a source of the intake heat will not pose the problem mentioned above, the slow temperature rise of engine coolant, when the cold engine is first started and during the subsequent warm up, will hamper stable operation of the engine because the excessively rich mixture supplied by choking the carburetor can not be vaporized sufficiently due to the low temperature of the engine coolant.

Still another conventional manifold system provides an arrangement in which an intake manifold and an exhaust manifold have a common wall forming the riser bottom wall of the intake manifold, a heater wall, in the exhaust manifold, extending in spaced and opposite relation to the common wall so that the common wall is exposed to heat radiated from the heater wall and means is provided in the intake manifold to make exhaust gas flow against the heater wall to heat same. The common wall and heater wall define a closed chamber so that the bottom wall is heated by the radiation heat alone. This manifold system has a problem in that to obtain sufficient temperature hike at the riser bottom wall for vaporization of the fuel droplets, the areas of the common wall and heater wall most large, thereby making the construction of the system bulky. Another problem of this manifold system is in that since the temperature at the common wall varies proportionally to the fourth power of the absolute temperature of the exhaust gas flowing adjacent the heater wall, the variation of the temperature adjacent the riser bottom wall and within the riser is greately affected by that of exhaust gas and hence erratic heating of the fuel mixture tends to occur.

It is an object of the present invention to provide an intake and exhaust manifold system for an internal combustion engine by which system constant heating of the air fuel mixture is provided with a relatively small drop of exhaust gas temperature.

It is a specific object of the present invention to provide an intake and exhaust manifold system for an internal combustion engine of the type employing an auxiliary combustion chamber associated with each main combustion chamber.

Other objects and features of the present invention will become clear as the description proceeds with reference to the accompanying drawings, in which:

FIG. 3 is a similar view to FIG. 1 and illustrates a second preferred embodiment of the present invention.

FIG. 4 is a cross sectional view taken through a line IV—IV of FIG. 3.

FIG. 7 is a similar view to FIG. 1 and illustrates a fourth preferred embodiment of the present invention.

FIG. 8 is a cross sectional view taken through a line VIII—VIII of FIG. 7.

FIG. 9 is a similar view to FIG. 1 and illustrates a fifth preferred embodiment of the present invention.

FIG. 10 is a cross sectional view taken through a line X—X of FIG. 9.

Figures 1, 2:
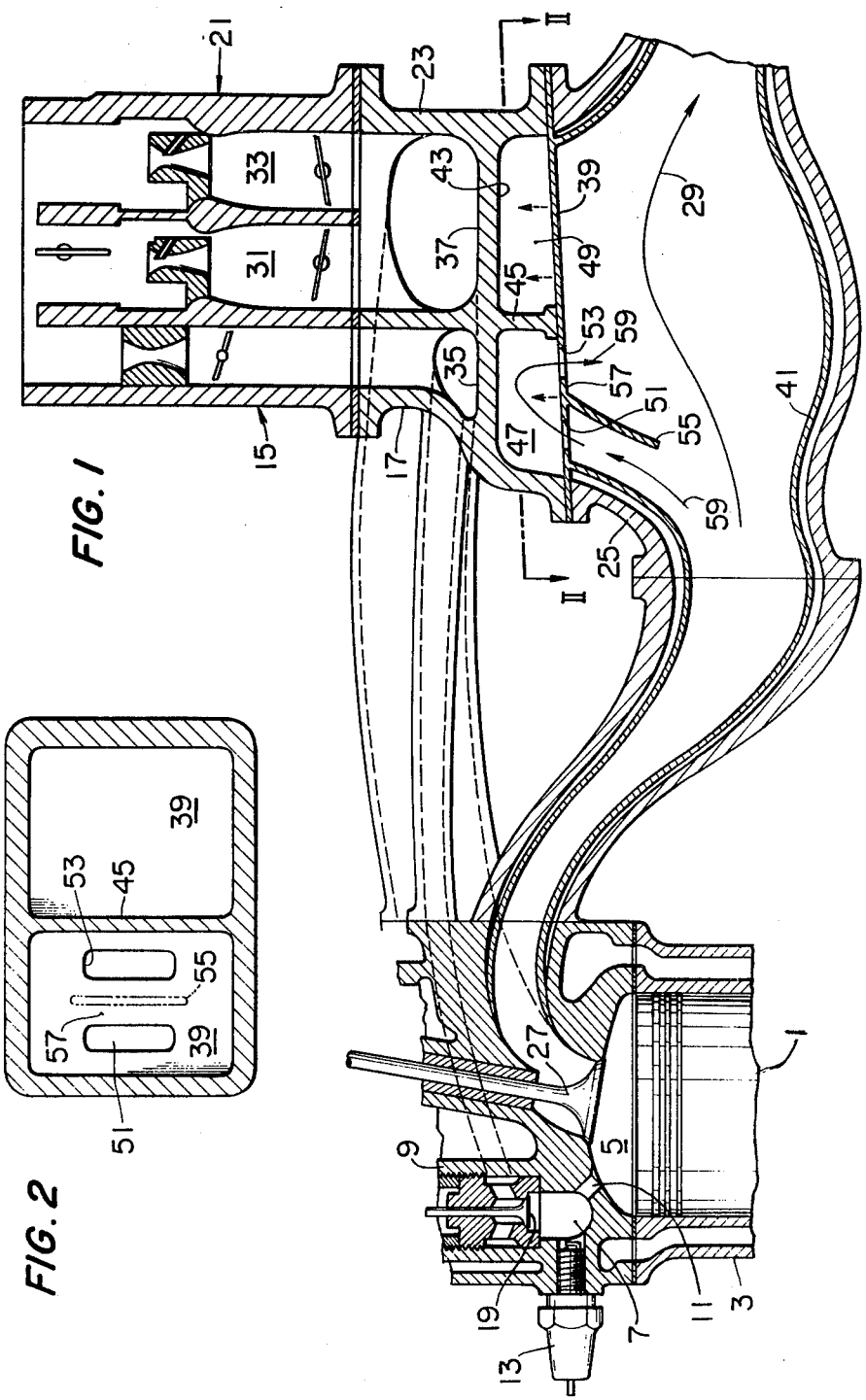
FIG. 1 is a sectional view of an internal combustion engine and an intake and exhaust manifold system which illustrates a first preferred embodiment of the present invention.
FIG. 2 is a cross sectional view taken through a line II—II of FIG. 1.

Referring to FIG. 1 of the accompanying drawings, a cross section of one combustion chamber arrangement of an internal combustion engine having a plurality of such combustion chamber arrangements is illustrated. Each such arrangement includes a piston 1 positioned in a conventional manner within a cylinder located in the engine block 3. A main combustion chamber 5 is provided above the piston 1 and an auxiliary combustion chamber 7 is provided in the engine cylinder head 9. The auxiliary combustion chamber 7 is in communication with the main combustion chamber 5 through a passageway or torch nozzle 11. A spark plug 13 is provided to initiate combustion within the auxiliary combustion chamber 7. The auxiliary combustion chamber 7 is supplied with a rich air fuel mixture from an auxiliary carburetor 15 through an auxiliary intake manifold 17 having an auxiliary intake valve 19. The main combustion chamber 5 is supplied with a lean air fuel mixture from a main carburetor 21 through a main intake manifold 23 having a main intake valve (not shown). Flow of exhaust gas through an exhaust manifold 25 from the main combustion chamber 5 is controlled by an exhaust valve 27. The direction of the flow through the inner tube 25 is indicated by a solid arrow 29. The main carburetor 21 and the auxiliary carburetor 15 are integrated into a single assembly, and the main carburetor 21 is of compound type having a primary barrel 31 and a secondary barrel 33.

Referring now to both of FIGS. 1 and 2, a first preferred embodiment of a manifold system is now described in more detail. To promote evaporation of the fuel droplets accumulated on a riser bottom wall 35 of the auxiliary intake manifold 17 and the evaporation of the fuel droplets accumulated on a riser bottom wall 37, a heater wall 39 which forms a part of an inner tube 41 disposed in the exhaust manifold 25 extends in spaced and opposite relation to a wall 43 which forms the two riser bottom walls 35 and 37 of the auxiliary and main intake manifolds 17 and 23. A partition 45 extends between the wall 43 and the heater wall 39 and two chambers 47 and 49 are provided below the two riser bottom walls 35 and 37, respectively. As best seen in FIG. 2, two openings 51 and 53 extend through that portion of the heater wall 39 which forms a wall of the chamber 47 and is opposite to the riser bottom wall 35. A deflector 55 projects inwardly of the inner tube 41 from a land 57 between the openings 51 and 53 so that they provide an arrangement whereby a part of the exhaust gas in the inner tube 41 flows into the chamber 47 through the opening 51 and then flows out of the chamber 47 through the opening 53 as indicated by two solid arrows 59.

The manifold system constructed as described above with reference to FIGS. 1 and 2 operates as follows. When the exhaust gas temperature within the inner tube 41 is low and there is little radiation heat from the heater wall 39 during the cold engine start-up and warm-up mode, the exhaust gas flow 59 plays an important role in elevating the temperature of the riser bottom wall 35 of the auxiliary intake manifold 17 and heat exchange between the fuel droplets on the riser bottom wall 35 and the exhaust gas flowing through the chamber 47 takes place, thereby assuring evaporation of the fuel in the auxiliary intake manifold 17. Under this mode the heat exchange between the fuel droplets separated from a lean air fuel mixture charge and the chamber 49 is not effective. However since the air fuel mixture charge flowing to the main combustion chamber 5 through the main intake manifold 23 is relatively lean, there is no possibility that the engine sucks fuel in its liquid state into the main combustion chamber 5. When the exhaust gas temperature rises, both of the riser bottom walls 35 and 37 are heated under the effect of radiation heat emitted from the heater wall 34 which is heated by the exhaust gas flow through the inner tube 41 and the riser bottom wall 35 is heated by the flow of exhaust gas 59 through the chamber 47 also. Thus the evaporation of fuel takes place in both of the auxiliary and main intake manifolds 17 and 23.

Since the heater wall 39 which forms a part of the inner tube 41 is not in direct contact relation with the wall 43 forming the riser bottom walls 35 and 37 of the auxiliary and main intake manifolds 17 and 23 and only a portion of the exhaust gas flow through the inner tube 41 comes into contact with the riser bottom wall 35 of the auxiliary intake manifold 17, the drop in exhaust gas temperature is small with the result that the exhaust gas temperature is maintained sufficiently high for the treatment, such as afterburning, within the exhaust gas purifier (not shown) installed in the exhaust pipe connected to the exhaust manifold 25.

Referring next to FIGS. 3 and 4, second embodiment of a manifold system is illustrated, in which the parts corresponding to those illustrated in the embodiment in FIGS. 1 and 2 are indicated by the same reference numerals for the sake of simplicity of description and ease of comparision with FIGS. 1 and 2. The manifold system of the second embodiment is different from the first embodiment in that it provides an arrangement whereby a portion of exhaust gas flowing through an inner tube 41 flows through a chamber 61 defined by a wall 43 and a heater wall 63 in such a manner that it flows through a space under a riser bottom wall 35 of an auxiliary intake manifold 17 before it flows through a space under a riser bottom wall 37 of a main intake manifold 23, the flow being represented by a solid arrow 59. To accomplish this, an opening 67 is located at a portion of the heater wall 63 under the riser bottom wall 35, serving as a flow-in port for the flow 59, and another opening 69 at a portion of the heater wall 63 under the riser bottom wall 37, serving as a flow-out port for the flow 65. A deflector 71 extends inwardly of the inner tube from a land portion of the heater wall between the flow-in and flow-out ports 67 and 69 to assure the flow represented by the arrow 65. A plurality of dashed arrows represent the direction of radiation heat emitted from the heater wall 63. It will be noted that eliminating the partition 45 (see FIG. 1) provides the space for the chamber 61 of this embodiment.

In the manifold system illustrated in FIG. 3, the riser bottom wall 37 of the main intake manifold 23 is exposed to the exhaust gas flow 59 to be heated thereby so that the evaporation of fuel droplets on the riser bottom wall 37 will take place even when the exhaust gas temperature within the inner tube 41 is relatively low and the radiation of heat from the heater wall 63 plays only a relatively small role in heating the riser bottom walls 35 and 37.

Figures 5, 6:
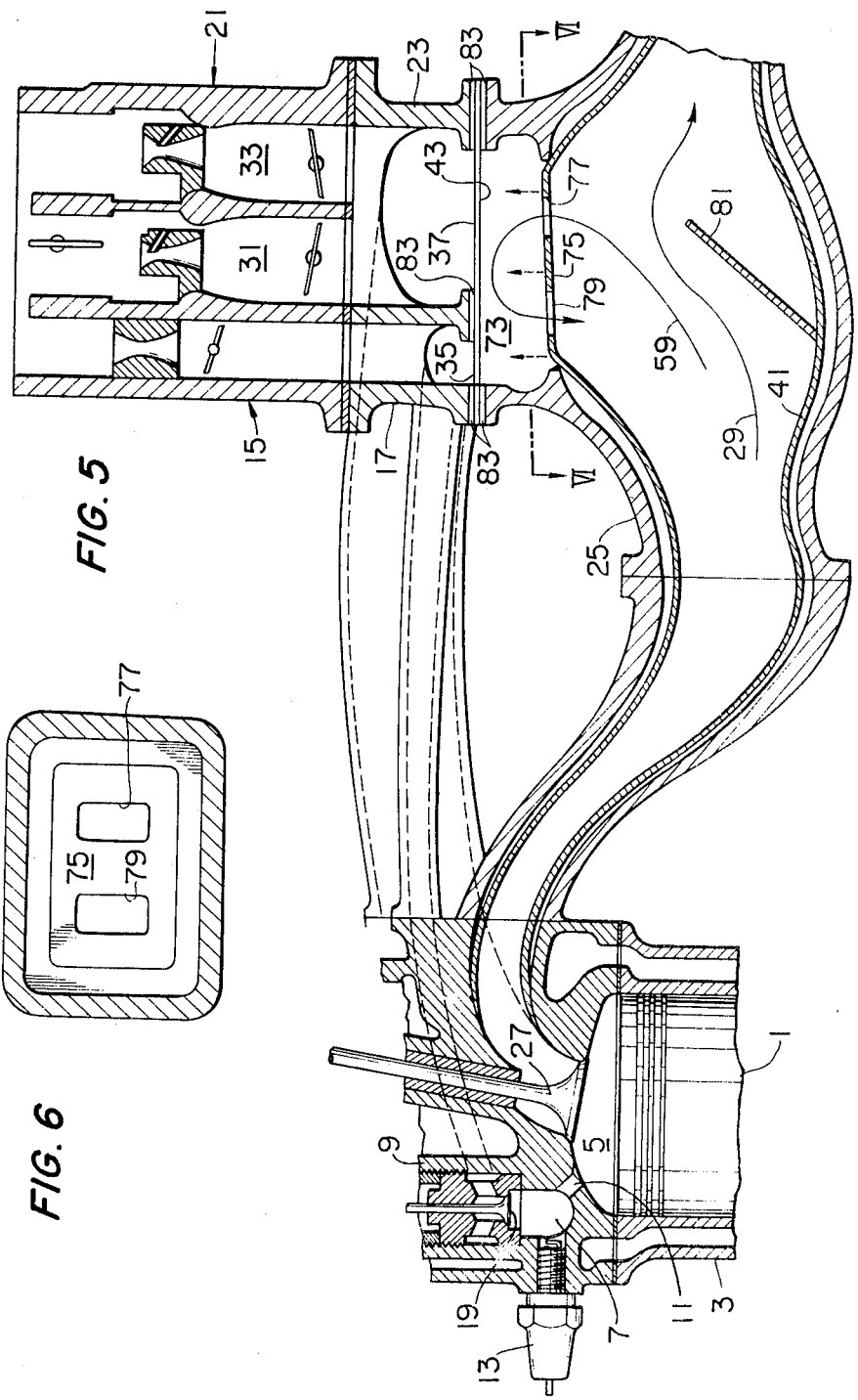
FIG. 5 is a similar view to FIG. 1 and illustrates a third preferred embodiment of the present invention.
FIG. 6 is a cross sectional view taken through a line VI—VI of FIG. 5.

Referring to FIGS. 5 and 6, a third embodiment of a manifold system is illustrated in which the same reference numerals used to designate parts in FIGS. 1 and 2 are used to designate the corresponding parts. This manifold system provides an arrangement whereby a portion of exhaust gas flowing through an inner tube 41 flows through a chamber 73 defined by a wall 43 and a heater wall 75 in such a manner that it flows through a space under a riser bottom wall 37 of a main intake manifold 23 before it flows through a space under a riser bottom wall 35 of an auxiliary intake manifold 17 (see an arrow 59 in FIG. 5). The heater wall 75 which forms a part of the inner tube 41 as is the case in the other embodiments is provided with an opening 77 serving as a flow-in port for the flow 59 at a portion under the riser bottom wall 37 and with another opening 79 serving as a flow-out port for the flow 59. To assure the exhaust gas flow as illustrated in FIG. 5, a deflector 81 or baffle plate extends from the opposite surface of the inner tube 41 to the heater wall 75 inwardly of the inner tube 41 and towards the heater wall 75.

To increase the efficiency of the heat exchange on the riser bottom walls 35 and 37, the wall 43 forming the riser bottom wall 35 and the riser bottom wall 37 of the main intake manifold is formed of a plate made of a highly heat conductive material, such as an iron plate. The iron plate forming the wall 43 is clamped between two opposing flanges forming on the intake manifolds 17 and 23 and the exhaust manifold 25 and insulated from the intake manifolds and the exhaust manifold by a plurality of insulators 83 to reduce the heat transmission to them. Although the use of a highly heat conductive plate as the wall 43 is now described in conjunction with the flow controlling arrangement illustrated in FIGS. 5 and 6, it is possible to incorporate it with the flow controlling arrangement illustrated in FIGS. 1 or 2 or a flow controlling arrangement which will hereinafter be described with reference to FIGS. 7 or 9 or 11, if desired.

Referring to FIGS. 7 and 8, a fourth embodiment of a manifold system is illustrated in which the parts corresponding to those illustrated in the embodiment in FIGS. 1 and 2 are indicated by the same reference numerals for the sake of simplicity and ease of comparison with FIGS. 1 and 2. The manifold system of the fourth embodiment is similar to the manifold system of the first embodiment in that a chamber below a riser bottom wall 37 of a main intake manifold 21 is closed so that the riser bottom wall 37 is heated by the radiation of heat emitted from a heater wall 39 (see FIG. 1) or 85 (see FIG. 7). However the former is different from the latter in that a riser bottom wall 36 of an auxiliary intake manifold 17 is heated by a flow of exhaust gas 59 alone. As best seen in FIG. 8, that portion of the heater wall 85 which is opposite to the riser bottom wall 35 and exposed to a chamber 87 below the riser bottom wall 35 is substantially all apertured to provide an opening 89 so that there remains no surface which emits heat toward the riser bottom wall 35. The size of the opening 89 should be wide enough for the easy circulation of exhaust gas without means such as a deflector.

Referring to FIGS. 9 and 10, a fifth embodiment of a manifold system is illustrated in which the parts corresponding to those illustrated in the embodiment in FIGS. 7 and 8 are indicated by the same reference numerals because they are similar in structure and in function except the following respects. In the manifold system shown in FIGS. 9 and 10 a portion of a flow of exhaust gas 59 flows through a chamber 49 below a riser bottom wall 37 of a main intake manifold 23 in a manner as represented by an arrow 91. An opening 93 serving as a flow-in port for the flow 91 is provided in a partition 45 and another opening 95 serving as a flow-out port for the flow 91 is provided in that portion of a heater wall 85 which forms a wall of the chamber 49. It will now be understood that the riser bottom wall 37 of the main intake manifold 23 is heated by both the exhaust gas flow 91 and the radiation heat emitted from the heater wall 85.

Figures 11, 12:
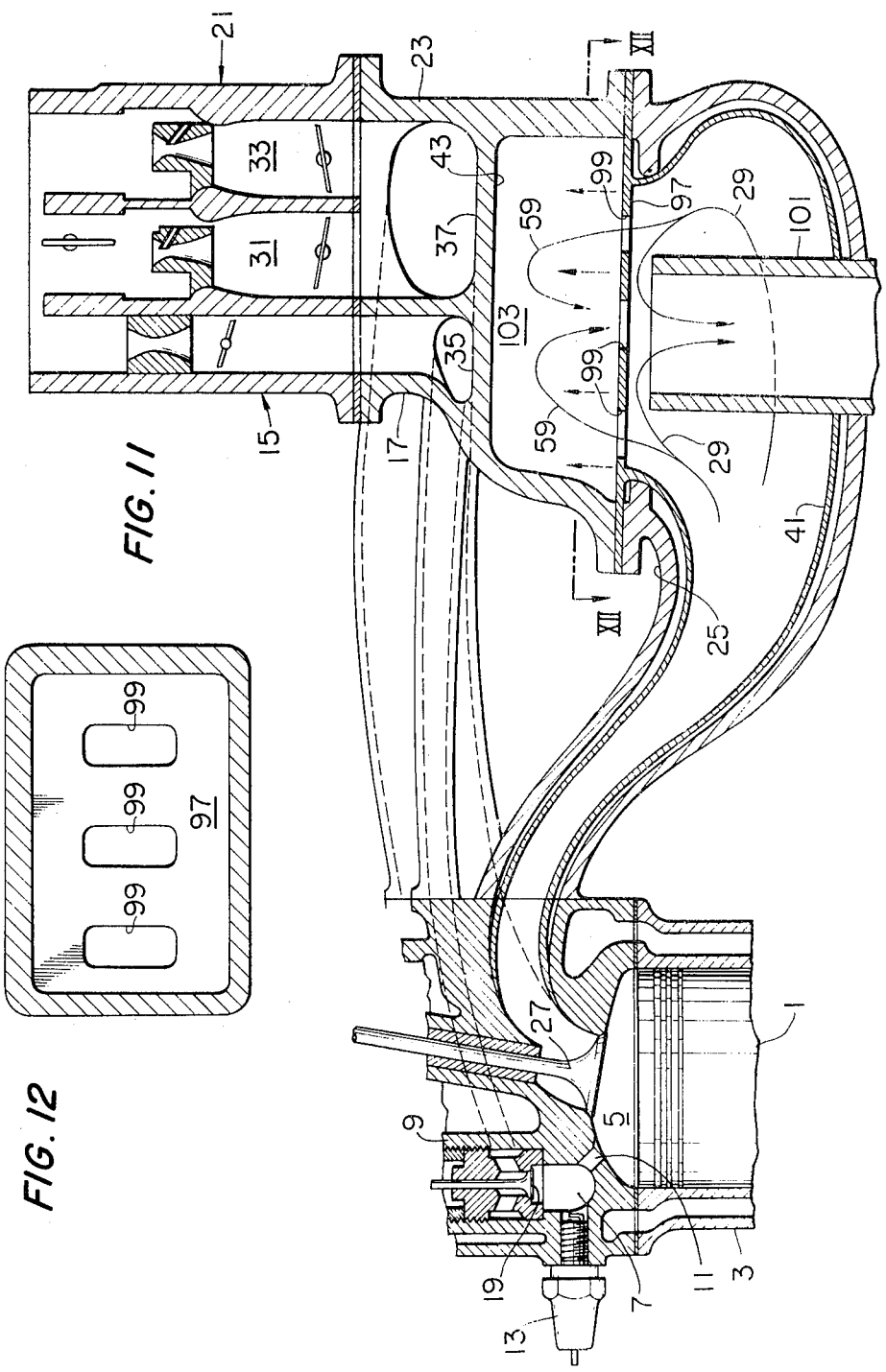
FIG. 11 is a similar view to FIG. 1 and illustrates a sixth preferred embodiment of the present invention.
FIG. 12 is a cross sectional view taken through a line XII—XII of FIG. 11.

Referring lastly to FIGS. 11 and 12, a sixth embodiment of a manifold system in which the corresponding parts to those illustrated the manifold system illustrated in FIG. 3 are indicated by the same reference numerals to those used therein. In the manifold system of the seventh embodiment a heater wall 97 has a plurality of openings 99 as best seen in FIG. 12 through which openings 99 exhaust gas flows, and the inlet end of an exhaust tail pipe 101 is located in spaced and opposite relation to the heater wall 97 so as to provide a flow arrangement whereby exhaust gas flows against the heater wall (see arrows 29) to heat the same to cause it to emit heat radiation toward the riser bottom walls 35 and 37 (see dashed arrows) and a portion of the exhaust gas flows into a chamber 103 and against the riser bottom walls 35 and 37 (see arrows 59). All exhaust gases will flow into the exhaust tail pipe 101 through its inlet end. It will be understood that the riser bottom walls 35 and 37 are heated by both the convection heat and the radiation heat.

What is claimed is:

1. A manifold system for an internal combustion engine of the type having an auxiliary combustion chamber associated with each main combustion chamber and connected thereto by a torch nozzle, comprising:

a main intake manifold in communication with the main combustion chamber, said main intake manifold including a first riser;

a carburetor for the main combustion chamber supported by said first riser for supplying a lean fuel air mixture to said main intake manifold;

an auxiliary intake manifold in communication with the auxiliary combustion chamber, said auxiliary intake manifold including a second riser;

a carburetor for the auxiliary combustion chamber supported by said second riser for supplying a rich fuel air mixture to said auxiliary intake manifold;

an exhaust manifold in communication with the main combustion chamber;

said main and auxiliary intake manifolds and said exhaust manifold having a common wall forming the respective riser bottom walls of said first and second risers, a heat conductive plate interposed between said main intake manifold and said exhaust manifold and between said auxiliary intake manifold and said exhaust manifold to serve as said common wall;

an insulator member interposed between said main intake manifold and said heat conductive plate and said auxiliary intake manifold and said heat conductive plate;

a second insulator member interposed between said exhaust manifold and said heat conductive plate; and exhaust liner means mounted within said exhaust manifold for defining a passage through which exhaust gas flows, said exhaust liner means having a heater wall, (a) said heater wall being heated by the flow of exhaust gas through said passage defined by said exhaust liner means, said heater wall extending in spaced and opposite relation to said common wall so that said common wall is exposed to heat radiated from said heater wall, said heater wall having at least one first port disposed in opposite relation to said riser bottom wall of said first riser and having at least one second port disposed in opposite relation to said riser bottom wall of said second riser;

said heater wall and said common wall defining a chamber;

said exhaust liner means having a deflector which is so disposed in the flow of exhaust gas through said passage of said exhaust liner means and positioned as to provide an arrangement whereby a substantially small proportion of the exhaust gas flowing through said passage of said exhaust liner means flows into said chamber through the second port first and flows out of said chamber into said passage of said exhaust liner means through the first port after having been in heat conductive contact with said common wall.

* * * * *